J. F. O'CONNOR.
SHOCK ABSORBER.
APPLICATION FILED JUNE 9, 1917.
1,329,795.
Patented Feb. 3, 1920.
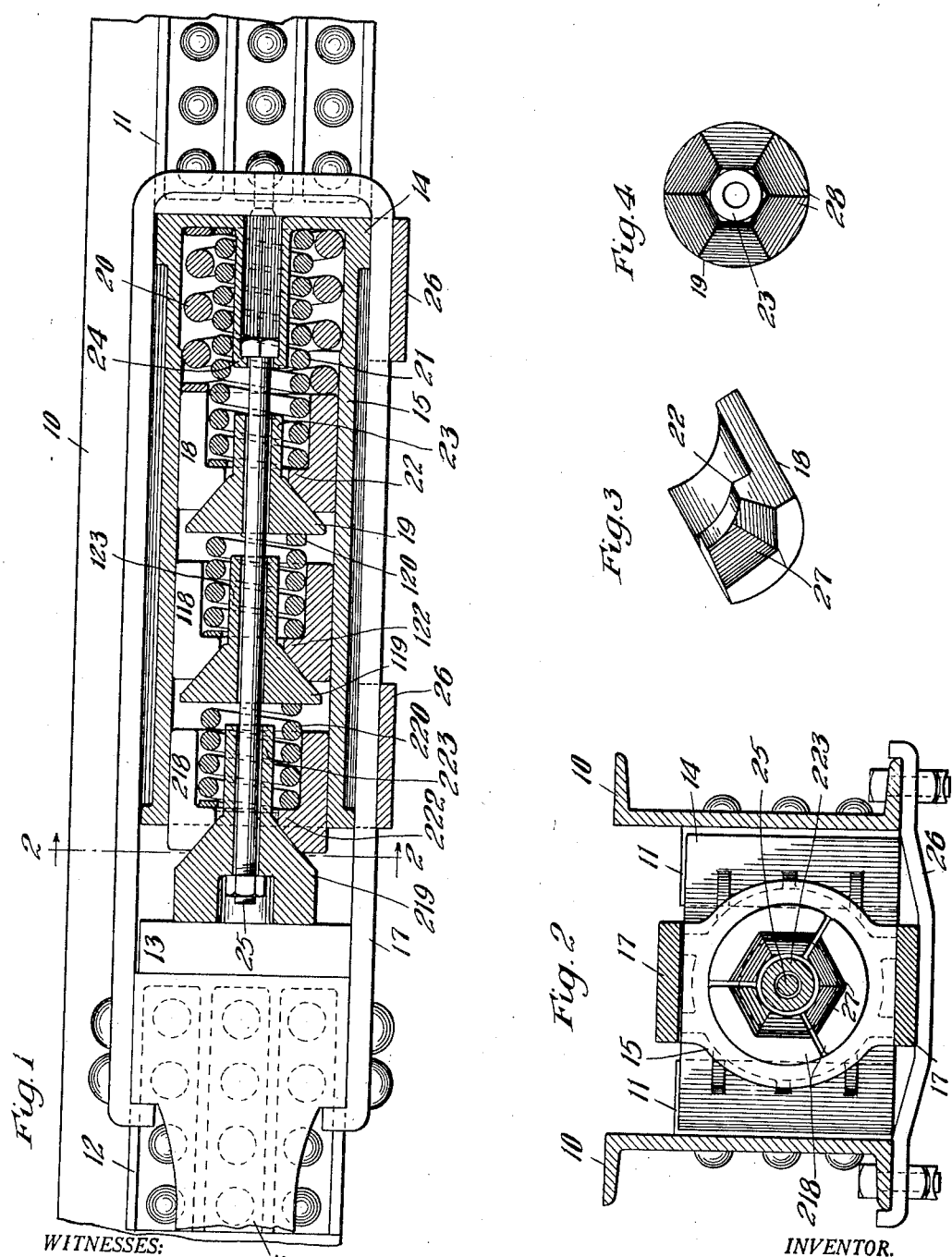
WITNESSES:
Wm. Geiger
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBER.

1,329,795.     Specification of Letters Patent.     Patented Feb. 3, 1920.

Application filed June 9, 1917. Serial No. 173,854.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbers, of which the following is a full, clear, concise, and exact description, reference being had to the accompanying drawings, forming a part of this specification.

This invention relates to improvements in shock absorbers.

The object of the invention is to provide a high capacity shock absorbing mechanism, more particularly adapted for railway draft gears, and wherein certain release is provided for and a series of individual sets of friction elements acting in tandem formation are employed, the total friction created equaling the sum of the friction generated by the individual sets as distinguished from a multiplied frictional resistance.

In the drawing forming a part of this specification, Figure 1 is a longitudinal vertical sectional view of a portion of a car draft rigging showing my improvements in connection therewith. Fig. 2 is a transverse vertical sectional view, taken substantially on the line 2—2 of Fig. 1. Fig. 3 is a perspective view of one of the friction shoes. And Fig. 4 is an end view of one of the wedges employed.

In said drawing, 10—10 denote channel-shaped center or draft sills of a railway car, said sills having rear stops 11 and front stops 12 secured thereto in the usual manner for coöperation with the usual front follower 13 and rear follower 14, the follower 14 in this instance being preferably formed integrally with a friction shell 15. A draw bar 16 is operatively connected with the friction gear by means of a yoke 17.

The improved shock absorber or friction gear, as shown, comprises said friction shell 15, and three sets of friction elements adapted to act in tandem formation. The inner set of friction elements comprises a series of friction shoes 18 with a coöperating wedge 19 and springs 20 and 21. The springs 20 and 21 bear at their rear ends against the rear wall of the shell, the outer heavy spring 20 bearing at its forward end against the rear ends of the shoes 18 and the forward end of the inner coil 21 bearing against inwardly extending shoulders 22 on the shoes.

The intermediate set of friction elements also comprises a plurality of friction shoes 118 and a wedge 119 with a coöperating spring 120. The spring 120 bears at its rear end against the forward face of the wedge 19 and at its forward end against shoulders 122 on the inner sides of the shoes 118. The front or outer set of friction elements comprises another series of friction shoes 218 with a coöperating wedge 219 together with a spring 220, said spring 220 bearing at its inner end against the wedge 119 and at its outer end against shoulders 222 formed on the shoes 218. The wedges 19, 119 and 219 are provided with inward extensions 23, 123 and 223, respectively, the inner ends of the extensions 123 and 223 being normally spaced from the adjacent wedges 19 and 119, respectively. The extension 23 is normally spaced from a forwardly extending boss 24 formed integrally with the rear wall of the friction shell. All of said wedges are also centrally recessed so as to accommodate a retaining bolt 25. The parts are held in position between the sills by suitable saddle plates 26—26.

As clearly shown in Figs. 3 and 4, each of the friction shoes is provided with a pair of wedge faces 27—27 at an angle of 120° to each other, and each wedge is provided with six corresponding wedge faces 28—28, it being understood that there are three friction shoes in each set.

The normal position of the parts is as shown in Fig. 1. Upon inward movement of the draw bar, it is obvious that pressure will be transmitted first to the wedge 219 and friction will be generated between the shoes 218 and the friction shell, the degree of friction being dependent upon the resistance of the spring 220. During the first portion of the inward movement of the draw bar, say for 1 inch, the intermediate and inner sets of friction elements will not be actuated. After the extension 223 of the front wedge engages the intermediate wedge 119, it is apparent that the intermediate set of friction elements will then begin to move and friction will be created between the shoes 118 and the friction shell, the amount of this friction being dependent upon the spring 120. Consequently, both the outer and intermediate sets of friction elements are moving in unison and the maximum friction created by the outer set will be that reached as the extension 223 of the front wedge engages the wedge 119. After the front and intermediate sets of friction elements have traveled another predetermined distance, say for one more inch, the extension 123 of the intermediate wedge will engage the rear or inner wedge 19, whereupon the rear set of friction elements will begin to operate in a manner similar to the other two sets so that during the last portion of the stroke, all three sets of friction elements are operating simultaneously and in tandem, inasmuch as the pressure from the draw bar is transmitted in each instance directly to the wedges of the various sets instead of through the friction shoes of one set to the wedge of the next set, as has been done heretofore in other types of friction gears. The operation under draft is the same as that above described except that the shell moves and the front wedge 219 is held stationary.

With the arrangement above described, I obtain an easy graduated frictional resistance, the parts being so devised that the resistances are added to each other rather than multiplied, thus preventing a frictional resistance between the wedge and shoes of such high degree as would prevent the release of the parts. With my construction, the angle between each wedge and its coöperating friction shoes can be made relatively blunt, thus avoiding the necessity of anti-friction rollers while at the same time obtaining the necessary total capacity of the friction gear.

I claim:

1. In a shock absorbing mechanism, the combination with a friction shell, of a plurality of sets of friction elements arranged in tandem formation, each set including a plurality of friction shoes, a solid wedge, and a spring associated therewith compressible in a direction parallel to the axis of the shell, and means for directly transferring pressure from the wedge of an outer set of elements to the wedge of the next inner set of elements.

2. In a shock absorbing mechanism, the combination with a friction shell, of a series of friction shoes coöperable with said shell, a spring for resisting movement of said shoes relatively to the shell, a wedge coöperable with said shoes, a second series of friction shoes, a wedge coöperable with said second series of shoes, a spring interposed between the first named wedge and said second named series of shoes, the second named wedge having an extension adapted to engage the first named wedge after a predetermined movement of the second named shoes and wedge relatively to the first named set of friction shoes and wedge.

3. In a shock absorbing mechanism, the combination with a friction shell, of three sets of friction elements coöperable therewith, each set comprising a plurality of friction shoes, a solid wedge, and a coiled spring having its axis extending parallel to the axis of the shell, said sets of friction elements being arranged in tandem formation and pressure being adapted to be transmitted from the wedge of one set directly to the wedge of the next adjacent set.

4. In a shock absorbing mechanism, the combination with a friction shell, of three sets of friction elements coöperable with said shell, said sets being arranged in tandem formation, the inner set comprising a plurality of friction shoes, a wedge and a spring interposed between the shoes and the shell; the intermediate set comprising a plurality of friction shoes, a wedge, and a spring interposed between the friction shoes and the wedge of the first named set; the outer set comprising a plurality of friction shoes, a wedge, and a spring interposed between the friction shoes and the wedge of the intermediate set, each of the wedges of the intermediate and outer sets having inward extensions adapted to directly engage the wedges of the intermediate and inner sets, respectively.

In witness that I claim the foregoing I have hereunto subscribed my name this 21st day of May, 1917.

JOHN F. O'CONNOR.